(12) United States Patent
Lu

(10) Patent No.: US 10,554,548 B2
(45) Date of Patent: Feb. 4, 2020

(54) PARTIALLY DEFERRED PACKET ACCESS

(71) Applicant: Futurewei Technologies, Inc., Plano, TX (US)

(72) Inventor: Yunsong Lu, Mountain View, CA (US)

(73) Assignee: Futurewei Technologies, Inc., Plano, TX (US)

( * ) Notice: Subject to any disclaimer, the term of this patent is extended or adjusted under 35 U.S.C. 154(b) by 253 days.

(21) Appl. No.: 15/199,373

(22) Filed: Jun. 30, 2016

(65) Prior Publication Data

US 2018/0006936 A1   Jan. 4, 2018

(51) Int. Cl.
| | | |
|---|---|---|
| *H04L 12/741* | (2013.01) | |
| *H04L 12/931* | (2013.01) | |
| *H04L 29/06* | (2006.01) | |

(52) U.S. Cl.
CPC ........... *H04L 45/74* (2013.01); *H04L 49/70* (2013.01); *H04L 69/22* (2013.01)

(58) Field of Classification Search
CPC ......... G06F 13/28; H04L 45/74; H04L 49/70; H04L 69/22
See application file for complete search history.

(56) References Cited

U.S. PATENT DOCUMENTS

| | | | |
|---|---|---|---|
| 6,615,282 B1 * | 9/2003 | Futral | G06F 13/385 710/1 |
| 7,764,676 B1 | 7/2010 | Dickman et al. | |
| 2006/0221953 A1 * | 10/2006 | Basso | H04L 1/0041 370/389 |
| 2011/0153875 A1 * | 6/2011 | Khericha | G06F 13/28 710/22 |
| 2016/0315950 A1 * | 10/2016 | Lospinuso | H04L 63/145 |

FOREIGN PATENT DOCUMENTS

WO   WO-2018/001239 A1   1/2018

OTHER PUBLICATIONS

"International Application Serial No. PCT/CN2017/090293, International Search Report dated Oct. 11, 2017", 3 pgs.
"International Application Serial No. PCT/CN2017/090293, Written Opinion dated Oct. 11, 2017", 3 pgs.
Fischer, Anna, et al., "Packet header/data split for improving control and performance of network I/O in virtualized systems", Disclosure by Hewlett Packard Company, Research Disclosure, No. 5833055, (Nov. 2012), 5 pgs.

* cited by examiner

*Primary Examiner* — Mansour Oveissi
(74) *Attorney, Agent, or Firm* — Schwegman Lundberg & Woessner, P.A.

(57) ABSTRACT

A method includes an interconnect performing a partial direct memory access of a packet to obtain packet header data of a packet header, using the packet header data to generate a packet forwarding decision identifying a packet destination address, and initiating a direct memory access of a packet payload to the packet destination address.

20 Claims, 3 Drawing Sheets

PARTIALLY DEFERRED PACKET ACCESS

FIELD OF THE INVENTION

The present disclosure is related to direct memory access and in particular to partially deferred packet access.

BACKGROUND

Software switches may be implemented on a host, such as a server, and may be used to forward data from one connected device to another, much like a hardware router. Direct memory access (DMA) of the packets may be done to transfer the data to the software switch, determine a destination for the data, and then initiate a further transfer of the data to the destination. The host operating the software switch may require significant buffer space in order to receive the data and in order to determine the destination.

In some servers that implement a software switch, a network accelerator may be used to accelerate the network functions, including for example, virtual switching. On a network accelerator, the data is received as packets, and packet switching decisions are made based on metadata provided by system software on the host and on the parsed headers of the packet, which is normally DMA'ed (direct memory accessed) from the host system, for example through a PCI-E (peripheral component interconnect express) bus.

Network accelerators may be able to DMA an entire packet to the accelerator then parse the packet and make a forwarding decision. A second DMA may be initiated when the destination of the packet is a virtual port/interface. This results in the accelerator having a memory large enough to buffer the packets, which may have size of 64B-64K each. The second DMA also increases latency of packet processing.

SUMMARY

A method includes an interconnect performing a partial direct memory access of a packet to obtain packet header data of a packet header, the interconnect using the packet header data to generate a packet forwarding decision identifying a packet destination address, and the interconnect initiating a direct memory access of a packet payload to the packet destination address.

A non-transitory computer readable storage device has instructions stored thereon for execution by a host computer to perform operations. The operations include performing a partial direct memory access of a packet to obtain packet header data of a packet header, using the packet header data to generate a packet forwarding decision identifying a packet destination address, and initiating a direct memory access of a packet payload to the packet destination address.

A system includes processing circuitry and a storage device having a packet buffer coupled to the processing circuitry. The processing circuitry is configured to perform operations including performing a partial direct memory access of a packet to obtain packet header data of a packet header, using the packet header data to generate a packet forwarding decision identifying a packet destination address, and initiating a direct memory access of a packet payload to the packet destination address.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked.

Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

A software switch operating on a host is used to transfer data between multiple different devices in an efficient manner. To speed the transfer of data, the interconnect receives a packet to be transferred and initiates a partial DMA of a header of the packet. The partial DMA is employed in order to obtain enough of the header to make a forwarding decision. The partial DMA may obtain part or all of the packet header. The partial DMA is performed to identify a destination for the packet, using the obtained portion of the header. A DMA of the payload (i.e., the remainder of the packet, possibly including a last part of the header) is then initiated in order to forward the packet to the destination. The forwarding includes the entire packet, both header and payload, in some examples.

The use of the partial DMA according to any of the embodiments herein saves time over prior methods that perform two full DMAs in order to transfer data. The use of the partial DMA according to any of the embodiments herein uses less memory than a traditional DMA operation. The use of the partial DMA according to any of the embodiments herein uses less system resources to transfer data than a traditional DMA operation and allows deferring a DMA, which includes at least the rest of a payload of the packet until the destination is identified by use of the partial DMA.

Figure 1:
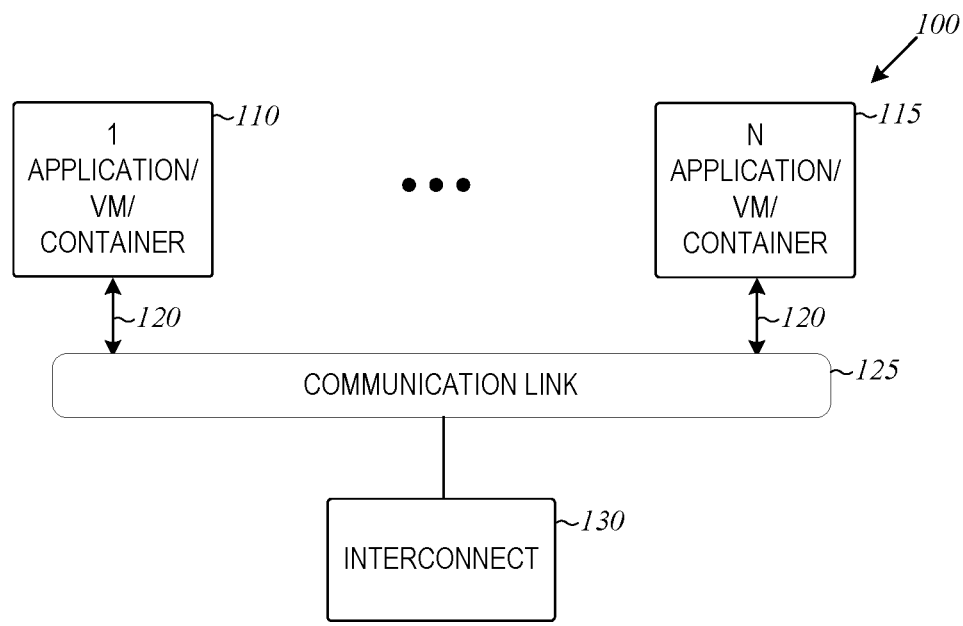
FIG. 1 is a block diagram of a system for performing efficient data transfer via virtual switch operations executing on a host according to an example embodiment.

FIG. 1 is a block diagram of a system 100 for performing efficient data transfer according to an example embodiment. Multiple devices, such as machine 1 110 through machine N 115 may be coupled via a communication link 120, such as a wired or wireless network or internal bus, such as a peripheral component interconnect (PCI) bus. The devices may be on separate systems in some embodiments, and may also include devices in a single system that are coupled via an internal bus. In further embodiments, the devices may be virtual machines or containers. Containers may be thought of as a lightweight form of virtual machine that sit on top of operating systems such as Linux, and share operation system kernel functions.

An interconnect 125, may be coupled via the communication link 120. The interconnect 125 transfers packets between components or systems, via the communication link 120. The interconnect 125 in some examples comprises or is similar to a bridge, a virtual switch, a router, a gateway, or other similar devices. These examples are merely examples and are not exhaustive or limiting examples. The interconnect 125 may include a switch and a processing system that operates the switch and provides routing functions. The switch in some examples comprises a virtual switch implemented in software. The interconnect 125, in some embodiments, performs packet processing functions including partial DMAs and deferral of DMA data transfers, such as transferring packets between the devices/systems. In some examples, the interconnect 125 performs data transfers including routing the packets being transferred. The interconnect 125 in some examples may be used to configure hardware to perform data transfers. In further embodiments, a hardware accelerator may be included in interconnect 125 to speed data transfer operations.

Figure 2:
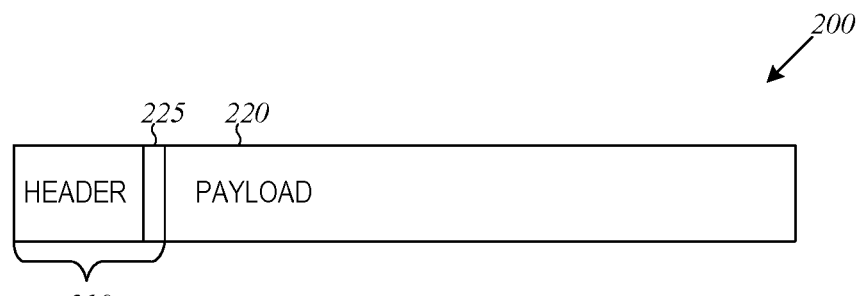
FIG. 2 is a block diagram of a packet to be transferred according to an example embodiment.

FIG. 2 is a block diagram of a packet 200 to be transferred according to an example embodiment. Packet 200 includes a header 210 and a payload 220. In various embodiments, the payload 220 is usually significantly larger than the header 210. The header 210 includes information, such as a destination identifier 225, that may be used by the interconnect 130 to transfer the packet 200 to a destination device or devices. In one embodiment, the destination identifier 225 may be located in different positions of the header. The position illustrated is at or near the end of the header, but may also be near the middle or beginning of the header in further embodiments or in implementations by different systems. In one embodiment, the portion of the header from beginning to inclusion of the destination identifier 225 is referred to as a necessary header length. The necessary header length in some embodiments may include the entire header, or may be just long enough to ensure that the destination identifier 225 is included in a transfer of the header to the interconnect 130.

Figure 3:
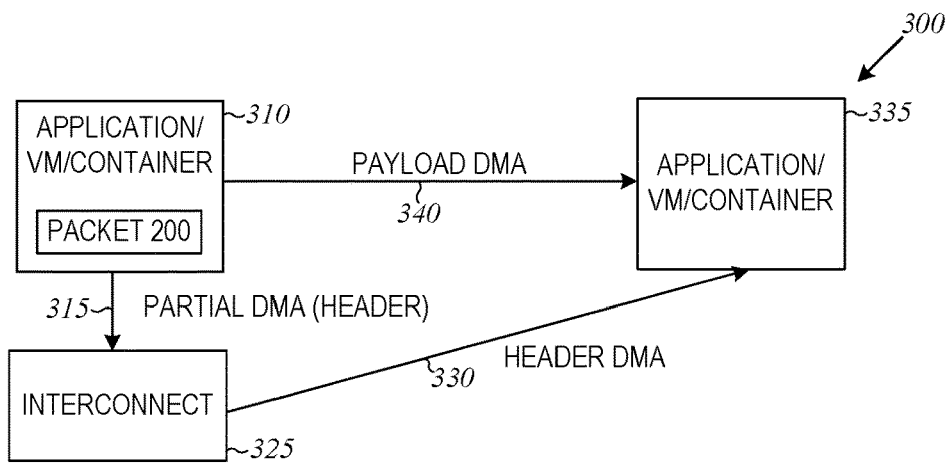
FIG. 3 is a block diagram of the system of FIG. 1 illustrating operational flow according to an example embodiment.

FIG. 3 is a block diagram 300 of the system of FIG. 1 illustrating operational flow. A source machine is shown as application/VM/container at 310. Application/VM/container 310 has data to transfer in the form of one or more packets 200 as shown in FIG. 2. At 315, a partial DMA (of a necessary header length) is performed to transfer the partial header data to an interconnect 325. The interconnect 325 parses the header 210 to obtain the destination identifier 225 (see FIG. 2) and determine where to route the packet 200. At 330, the header, augmented with routing information describing a direct memory access path for the payload, may be transferred to a destination application/VM/container at 335 to initiate a DMA of the payload 220. The transfer to the destination application/VM/container at 335 may also be a DMA type of transfer. Application/VM/container 335 uses the header obtained from the header DMA to obtain the payload 220 directly from application/VM/container 310, via a further DMA operation. Since the header 210 is usually much shorter than the payload 220, the initial partial DMAs of the header between the host and machines utilize fewer computing resources than prior methods that DMA entire packets multiple times.

Figure 4:
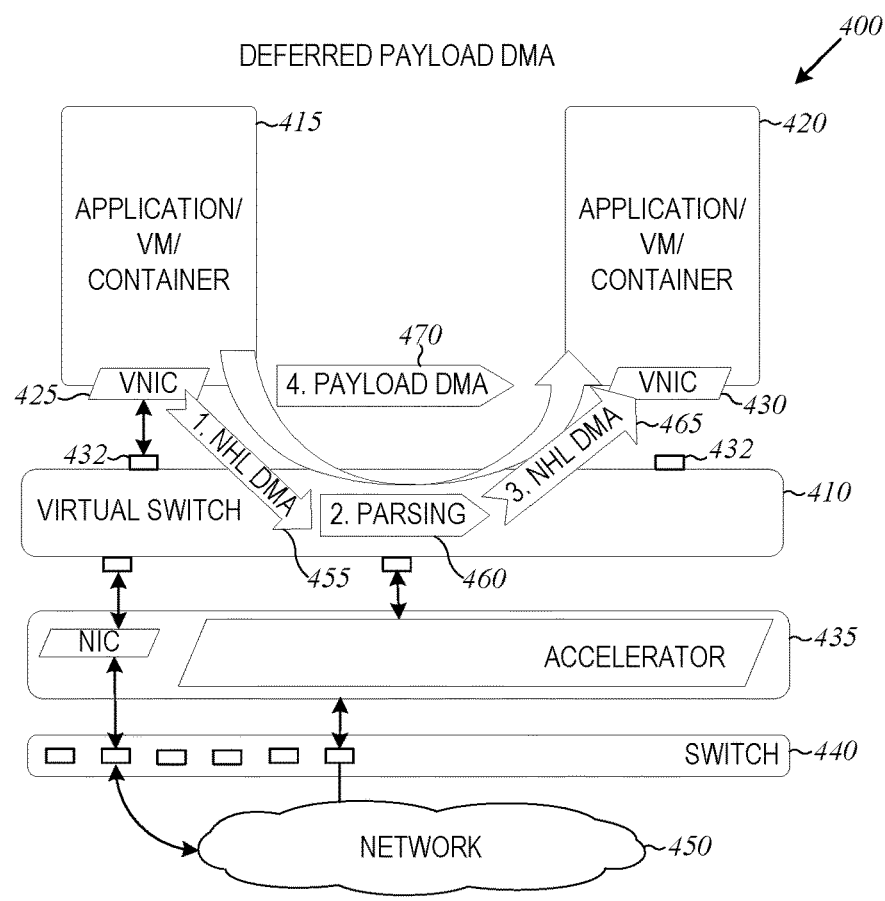
FIG. 4 is a block diagram of a system that includes a switch that is coupled to multiple virtual machines that include a virtual network function (VNF) to provide networking communication services according to an example embodiment.

FIG. 4 is a block diagram of a system 400 that includes a virtual switch 410 coupled to multiple application/VM/containers 415, 420. The system 400 includes a virtual network function (VNF) to enable transfer of data via a network or virtual network. In one embodiment, the application/VM/containers include Linux containers (LNX) for running isolated operating systems or containers on virtual machines.

The application/VM/containers 415 and 420 may include virtual network interface cards (VNICs) indicated at 425, 430 to couple to the ports of the virtual switch 410, with the ports indicated as small rectangles 432. In one embodiment, a network accelerator 435 may be coupled to the virtual switch 410 to provide a fast data path. The accelerator 435 may be further coupled to a switch 440 which in turn may be coupled to a physical network 450, such as a data center or Internet. The virtual switch 410 may operate on a server, also referred to as a host, which may also include the accelerator 435 and the switch 440. In one embodiment, the virtual 410 switch may be a software-based switch executing on the host. The host may run directly on a server or may be virtual host managed by a hypervisor running on a server.

In one embodiment, the virtual switch 410 may receive a request to forward a packet from one application/VM/container 415 to another application/VM/container 420, or in some embodiments to another device coupled via the physical network 450. The request may include an address of the packet in the virtual machine 415, or specify where the address may be found when the switch is ready to start a process to forward the packet.

In one embodiment, the virtual switch or host software will be aware of the protocol used for packet parsing and forwarding. Such knowledge allows configuration of a packet forwarding decision length, also referred to as "necessary header length" (NHL) in metadata, which may be exchanged with the accelerator 435. The accelerator 435 reads the NHL and only obtains the specified length of a target packet via a partial direct memory access 455 or copy function to obtain the NHL from memory of the application/VM/container 415. The partial direct memory access may obtain a portion of the header that is padded to a word-aligned length of the packet. Using the retrieved portion of the packet corresponding to the part of the header, the virtual switch 410 parses the retrieved portion at 460 and provides it at 465 to the destination application/VM/container 420. Subsequently, a second, payload DMA/COPY 470 is performed to DMA the payload directly to the destination address (or to just drop the packet).

Partially deferring packet access can greatly reduce the utilization of a bus, such as the peripheral component interconnect express (PCI-E) bus. Partially DMAed packets are a significant reduction in communication load in comparison to a full DMA of the entire packet. Further, latency of waiting for DMA'ing the whole packet may be avoided.

The second DMA 470 may be done after the forwarding decision by the parsing 460, so the DMA can directly move the payload to a destination address determined from the first partial DMA of the header. The destination address might be another system memory. Buffer resources on accelerator 435 can be greatly conserved and performance can be improved.

The same approach can be used between the virtual switch 410 and a virtual NIC 425 or 430, where DMA'ing/copying data from a frontend can be partially deferred following the same mechanism.

Figure 5:
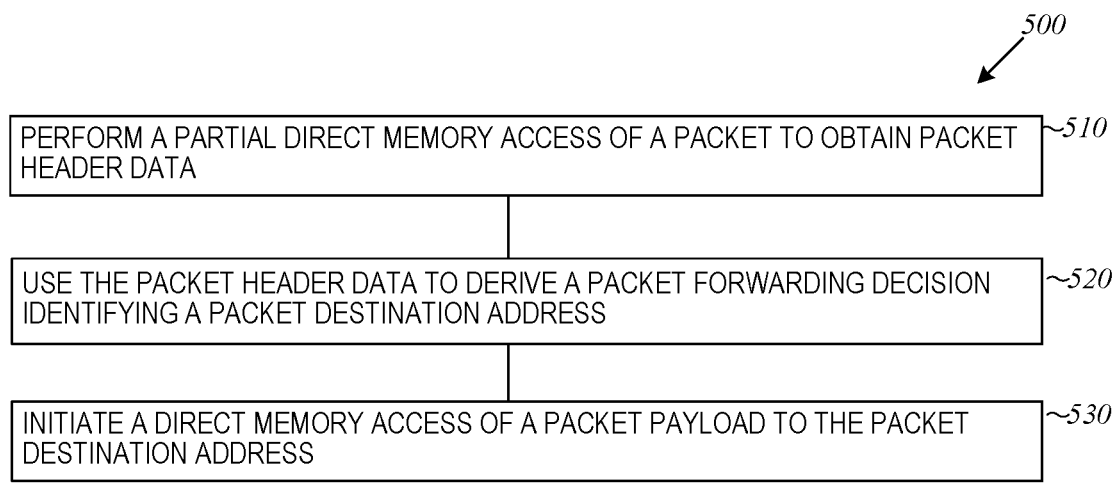
FIG. 5 is a flowchart illustrating a method for forwarding packets according to an example embodiment.

FIG. 5 is a flowchart illustrating a method 500 for forwarding packets. In one embodiment, a partial direct memory access of a packet is performed at step 510 by an interconnect to obtain packet header data of a packet header. The partial direct memory access obtains at least a portion of the packet header, including a destination identifier that identifies a destination of the packet. At step 520, the packet header data is used to generate a packet forwarding decision identifying a packet destination address. The interconnect uses the obtained portion of the packet header data to generate the packet forwarding decision. At step 530, a direct memory access of a packet payload to the packet destination address is initiated by the interconnect. In some examples, the interconnect both initiates the payload DMA operation and subsequently performs the payload DMA operation. Alternatively, the interconnect initiates the payload DMA operation and another device, component, or application performs the payload DMA operation.

In one embodiment, the packet forwarding decision length determines an amount of the packet header to obtain in a partial direct memory access operation. The packet forwarding decision length is obtained and used to determine the amount of data to obtain via the partial direct memory access. The packet forwarding decision length may be obtained as metadata, such as from a host or similar device or system. The partial direct memory access of the packet may be padded to a word-aligned length of the packet. The interconnect may be a packet switch in some embodiments. The interconnect may be a packet switch hardware accelerator in some embodiments.

In one embodiment, the packet switch comprises a virtual switch and virtual network interface card. In a further embodiment, the partial direct memory access includes receiving a request at the packet switch to forward the packet. An address of the packet may be obtained based on the request to enable the switch to initiate the partial direct memory access.

Figure 6:
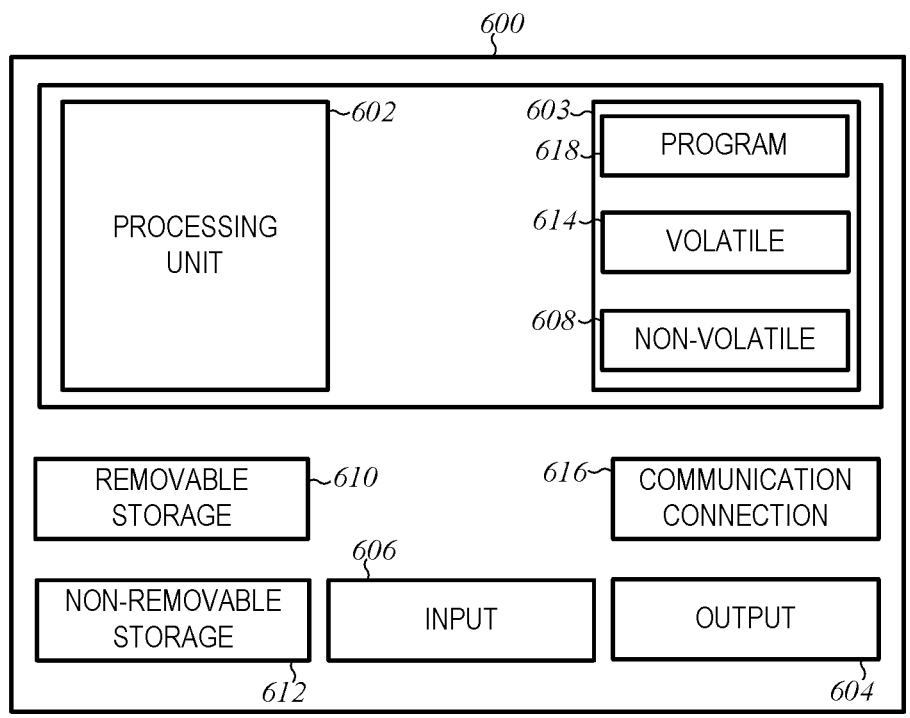
FIG. 6 is a block diagram illustrating circuitry for implementing algorithms and performing methods according to example embodiments.

FIG. 6 is a block diagram illustrating circuitry for clients, servers, hosts, or cloud based resources for implementing algorithms and performing operations, including virtual switching according to example embodiments. All components need not be used in various embodiments.

One example computing device in the form of a computer 600 may include a processing unit 602, memory 603, removable storage 610, and non-removable storage 612. The memory 603 may be used to provide a packet buffer in some embodiments which may be used to receive partial and/or full DMAs. Although the example computing device is illustrated and described as computer 600, the computing device may be in different forms in different embodiments. For example, the computing device may instead be a smartphone, a tablet, smartwatch, or other computing device capable of executing a software switch and including the same or similar elements as illustrated and described with regard to FIG. 6. Devices, such as smartphones, tablets, and smartwatches, are generally collectively referred to as mobile devices or user equipment. Further, although the various data storage elements are illustrated as part of the computer 600, the storage may also or alternatively include cloud-based storage accessible via a network, such as the Internet or server based storage.

Memory 603 may include volatile memory 614 and/or non-volatile memory 608. Computer 600 may include—or have access to a computing environment that includes—a variety of computer-readable media, such as volatile memory 614 and non-volatile memory 608, removable storage 610 and non-removable storage 612. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 600 may include or have access to a computing environment that includes input 606, output 604, and a communication connection 616. Output 604 may include a display device, such as a touchscreen, that also may serve as an input device. The input 606 may include one or more of a touchscreen, touchpad, mouse, keyboard, camera, one or more device-specific buttons, one or more sensors integrated within or coupled via wired or wireless data connections to the computer 600, and other input devices. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN), cellular, WiFi, Bluetooth, or other networks.

Computer-readable instructions stored on a computer-readable medium, i.e., a program 618, are executable by the processing unit 602 of the computer 600 to perform the partial and full DMAs described above in the various components involved in such DMAs in different embodiments. The terms computer-readable medium and storage device do not include carrier waves to the extent carrier waves are deemed too transitory. Storage can also include networked storage such as a storage area network (SAN) indicated at 620.

Examples

1. In example 1, a method includes an interconnect performing a partial direct memory access of a packet to obtain packet header data of a packet header, the interconnect using the packet header data to generate a packet forwarding decision identifying a packet destination address, and the interconnect initiating a direct memory access of a packet payload to the packet destination address.

2. The method of example 1 and further comprising a preliminary operation of obtaining a packet forwarding decision length corresponding to an amount of the packet header to obtain in the partial direct memory access.

3. The method of example 2 wherein the packet forwarding decision length is derived from metadata.

4. The method of example 2 wherein the partial direct memory access of the packet is padded to a word-aligned length of the packet.

5. The method of any of examples 1-4 wherein the forwarding decision is generated via a packet switch comprising a packet switch accelerator, which may be a hardware based accelerator.

6. The method of any of examples 1-5 wherein the forwarding decision is generated via a packet switch comprising a virtual switch and virtual network interface card.

7. The method of any of examples 1-6 further comprising receiving a request to forward the packet.

8. The method of example 7 further comprising obtaining the destination address of the packet based on the request.

9. In example 9, a non-transitory computer readable storage device has instructions stored thereon for execution by a host computer to perform operations. The operations include performing a partial direct memory access of a packet to an interconnect to obtain packet header data of a packet header, using the packet header data to generate a packet forwarding decision identifying a packet destination address, and initiating a direct memory access of a packet payload to the packet destination address.

10. The computer readable storage device of example 9 further comprising obtaining a packet forwarding decision length corresponding to an amount of the packet header to obtain in the partial direct memory access.

11. The computer readable storage device of example 10 wherein the packet forwarding decision length is obtained as metadata.

12. The computer readable storage device of example 10 wherein the partial direct memory access of the packet is padded to a word-aligned length of the packet.

13. The computer readable storage device of any of examples 9-12 wherein generating a packet forwarding decision identifying a packet destination address is performed by a packet switch accelerator.

14. The computer readable storage device of any of examples 9-13 wherein the interconnect comprises a virtual switch and virtual network interface card.

15. In example 15, a system includes processing circuitry and a storage device coupled to the processing circuitry. The storage device may include a packet buffer in some embodiments. The processing circuitry is configured to perform operations including performing a partial direct memory access of a packet to obtain packet header data of a packet header, using the packet header data to generate a packet forwarding decision identifying a packet destination address, and initiating a direct memory access of a packet payload to the packet destination address.

16. The system of example 15 wherein the operations further comprise obtaining a packet forwarding decision length corresponding to an amount of the packet header to obtain in the partial direct memory access, wherein the packet forwarding decision length is obtained as metadata, and wherein the partial direct memory access of the packet is padded to a word-aligned length of the packet.

17. The system of any of examples 15-16 and further comprising a packet switch accelerator to perform the packet forwarding decision operation.

18. The system of any of examples 15-17 wherein the processing circuitry in combination with code stored on the storage device comprises a virtual switch and virtual network interface card.

19. The system of any of examples 15-18 wherein the operations further comprise receiving a request at the packet switch to forward the packet.

20. The system of example 19 wherein the operations further comprise obtaining an address of the packet based on the request.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A method comprising:
   an interconnect performing a partial direct memory access (DMA) of a packet in a memory to obtain only packet header data of a packet header of the packet;
   the interconnect identifying a packet destination address of the packet using the packet header data; and
   providing, by the interconnect to a destination application, the packet header data and routing information describing a DMA path for a payload of the packet, wherein the destination application can use the packet header data and the routing information to perform a DMA of the payload of the packet from the memory to the packet destination address.

2. The method of claim 1, further comprising, prior to the performing of the partial direct memory access of the packet to obtain the packet header data, obtaining a partial packet header length corresponding to an amount of the packet header to obtain in the partial direct memory access.

3. The method of claim 2, further comprising deriving the partial packet header length from metadata.

4. The method of claim 2, further comprising padding the partial direct memory access of the packet to a word-aligned length of the partial packet header length.

5. The method of claim 1, wherein a forwarding decision is generated via a packet switch comprising a packet switch hardware accelerator.

6. The method of claim 1, wherein a forwarding decision is generated via a packet switch comprising a virtual switch and a virtual network interface card.

7. The method of claim 1, further comprising receiving a request to forward the packet.

8. The method of claim 7, wherein the identifying of the packet destination address of the packet is further based on the request.

9. A non-transitory computer readable storage device having instructions stored thereon for execution by an interconnect to perform operations comprising:
   performing a partial direct memory access (DMA) of a packet in a memory to the interconnect to obtain only packet header data of a packet header of the packet;
   identifying a packet destination address of the packet using the packet header data; and
   providing, to a destination application, the packet header data and routing information describing a DMA path for a payload of the packet, wherein the destination application can use the packet header data and routing information to perform a DMA of the payload of the packet from the memory to the packet destination address.

10. The computer readable storage device of claim 9, wherein the operations further comprise, prior to the performing of the partial direct memory access of the packet to obtain the packet header data, obtaining a partial packet header length corresponding to an amount of the packet header to obtain in the partial direct memory access.

11. The computer readable storage device of claim 10, wherein the operations further comprise obtaining the partial packet header length as metadata.

12. The computer readable storage device of claim 10, wherein the operations further comprise padding the partial direct memory access of the packet to a word-aligned length of the partial packet header length.

13. The computer readable storage device of claim 9, wherein the identifying of the packet destination address is performed by a packet switch hardware accelerator.

14. The computer readable storage device of claim 9, wherein the interconnect comprises a virtual switch and a virtual network interface card.

15. A system comprising:
processing circuitry; and
a storage device having a packet buffer coupled to the processing circuitry, the processing circuitry configured to perform operations comprising:
performing a partial direct memory access (DMA) of a packet in a memory to obtain only packet header data of a packet header of the packet;
identifying a packet destination address of the packet using the packet header data; and
providing, to a destination application, the packet header data and routing information describing a DMA path for a payload of the packet, wherein the destination application can use the packet header data and routing information to perform a DMA of the payload of the packet from the memory to the packet destination address.

16. The system of claim 15, wherein the operations further comprise, prior to the performing of the partial direct memory access of the packet to obtain the packet header data, obtaining a partial packet header length corresponding to an amount of the packet header to obtain in the partial direct memory access, wherein the partial packet header length is obtained as metadata, and wherein the partial direct memory access of the packet is padded to a word-aligned length of the partial packet header length.

17. The system of claim 15, further comprising a packet switch accelerator to perform the packet forwarding decision operation.

18. The system of claim 15, wherein the processing circuitry in combination with code stored on the storage device comprises a virtual switch and a virtual network interface card.

19. The system of claim 15, wherein the operations further comprise receiving a request to forward the packet.

20. The system of claim 19, wherein the identifying of the packet destination address of the packet is further based on the request.

* * * * *